[19] United States Patent
Woodward

[11] 3,924,168
[45] Dec. 2, 1975

[54] SOLID STATE BRIDGE CIRCUIT FOR D.C. SERVO SYSTEMS

[75] Inventor: Morton P. Woodward, Vestal, N.Y.

[73] Assignee: Universal Instruments Corporation, Binghamton, N.Y.

[22] Filed: Nov. 10, 1970

[21] Appl. No.: 88,407

[52] U.S. Cl. .................. 318/257; 318/294
[51] Int. Cl.² .................. H02P 7/28
[58] Field of Search .......... 318/257, 258, 269, 293, 318/294, 345, 367, 368, 376, 143–145, 366, 453–455, 459, 474

[56] References Cited

UNITED STATES PATENTS

| | | | |
|---|---|---|---|
| 3,036,254 | 5/1962 | Hawkins et al. | 318/143 |
| 3,233,161 | 2/1966 | Sikorra | 318/294 X |
| 3,371,259 | 2/1968 | James et al. | 318/269 |
| 3,427,520 | 2/1969 | Oppedahl | 318/294 X |
| 3,496,441 | 2/1970 | Heider et al. | 318/257 |
| 3,597,671 | 8/1971 | Adams et al. | 318/341 X |

*Primary Examiner*—Robert K. Schaefer
*Assistant Examiner*—W. E. Duncanson, Jr.
*Attorney, Agent, or Firm*—Fidelman, Wolffe & Leitner

[57] ABSTRACT

A solid state bridge circuit for controlling the operation of a high response D.C. motor in a servo system having velocity and current feedback. The system utilizes time delay circuitry for switching motor currents and transistorized switching circuits which are adaptable to be controlled by a digitalized logic control device.

2 Claims, 10 Drawing Figures

INVENTOR
MORTON P. WOODWARD

BY Wildman, Wolffe & Leitner

ATTORNEY

INVENTOR
MORTON P. WOODWARD

BY Fidelman, Wolffe & Leitner
ATTORNEY

INVENTOR
MORTON P. WOODWARD

BY Aidelman, Wolffe & Leitner
ATTORNEY

INVENTOR
MORTON P. WOODWARD

BY Fidelman, Wolffe & Leitner

ATTORNEY

SOLID STATE BRIDGE CIRCUIT FOR D.C. SERVO SYSTEMS

This invention relates to a novel bridge circuit for controlling the operation of servo motors run by a digitalized control device.

The advantages of designing a servo bridge system for operation by direct control by a computer is that the servo motor is readily adaptable to digital control. Prior bridge circuits have been designed but not to be controlled directly by a digital system. Special purpose computers and tape readers have been used but with analog control of the servo system.

The advantages of using a D.C. motor in a solid state bridge circuit is that it has a high response, the power dissipation is low, current can be put in the motor in either direction and, as previously mentioned, it is adaptable to digital control.

The bridge circuit is particularly adaptable for use with closed loop programmed control using a digital computer of the general purpose computer variety. With this type of computer, the system adds or subtracts the error and sends out a correcting pulse. These pulses control the time of opening and closing of the transistorized switches.

In the present system, the drive logic functions to prevent switch overlap, determines current polarity and magnitude, sets the overcurrent limit and sets the minimum time to allow the stored charge to dissipate.

As stated previously, the velocity error and current error are added or subtracted from the command information and fed to the drive logic. The computer, from this information, compares this feedback with its position register and determines where the device operated by the servo system should be.

Accordingly, it is an object of this invention to provide a solid state servo bridge circuit for operating a D.C. motor.

It is a further object of this invention to provide a transistorized bridge circuit for controlling a permanent magnet servo motor which is controlled by digital pulses.

It is a still further object to provide a solid state bridge circuit by which a closed-loop digital computer system can control D.C. servo motors.

These and other objects will become apparent during the following discussion taken with reference to the following drawings in which.

Figure 1:
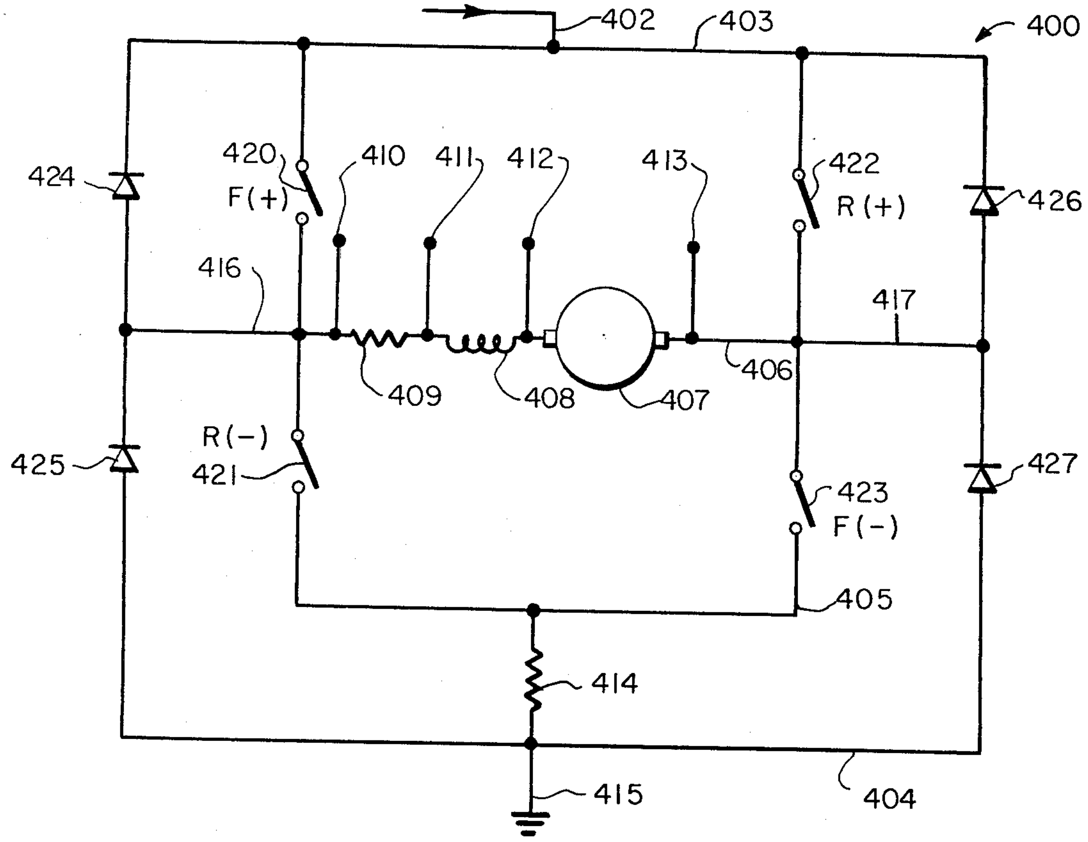
FIG. 1 is a circuit schematic showing the basic configurations of the present bridge circuit.

Referring now to FIG. 1, there is shown the bridge circuit 400 which comprises this invention.

The problem encountered is centered around how to drive a permanent magnet D.C. motor so as to be able to put current into the motor in either direction and drive it in either direction while maintaining a high response and while keeping power dissipation down. Another requirement was to digitalize the bridge circuit since the commands to the motor would be from direct digital computer control utilizing a general purpose digital computer. The immediate application of the bridge circuitry is to drive two or three positioning motors on an X–Y, or X, Y, Z system, respectively.

Figure 2:
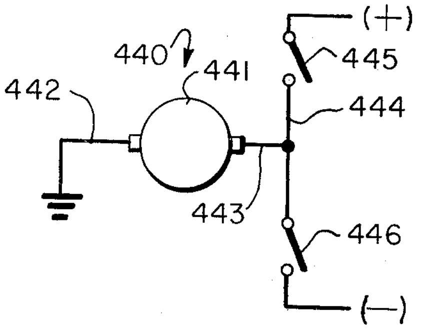
FIG. 2 is a circuit schematic of a prior art system.

One solution, referring to FIG. 2, has been to drive a D.C. motor 441 by connecting one side thereof to a ground 442 anad the other side, via wire 443, to a switch circuit 444. By alternating the position of switches 445 and 446, the current can be fed to motor 441 through either switch to drive the motor in either direction. The problem with such a system is that it requires two power supplies and affords no control of regeneration.

Figure 3:
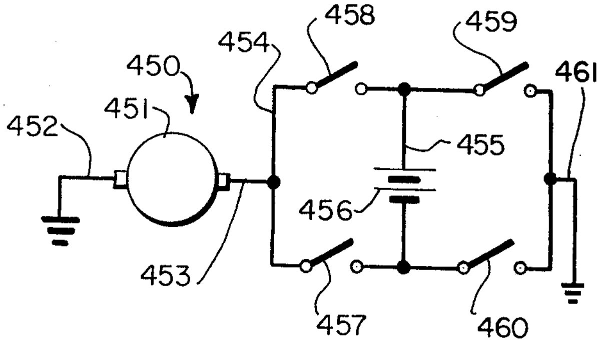
FIG. 3 is another circuit schematic of another prior art bridge circuit.

Another approach to the problem is shown in FIG. 3. A D.C. motor, 451, has one side connected with a ground 452 and the other side, via wire 453 to a switching circuit 454. Circuit 454 has a power source 456 thereacross and connected thereto by wire 455 and has a ground 461.

On each side of power source 456 are a pair of switches, 457 and 458, and 459 and 460. By closing switches 458 and 460, a complete circuit is formed and motor 451 is driven in one direction. To slow down, stop or drive the motor in the opposite direction, switches 458 and 460 are opened and switches 457 and 459 are closed. This action changes the power source polarity and tends to drive the motor in the opposite direction. The disadvantages in such a system are that as the system cannot be both plus and minus simultaneously, there is no control over regeneration and the system supply cannot be shared.

The present invention is shown in FIG. 1, designated as 400. It consists of an input wire 402 connected to a main distribution line 403 which connects, in turn, with inner circuit loop 405 and outer circuit loop 404. Mounted across inner loop 405 is line 406 containing permanent magnet D.C. motor 407, inductance 408 and resistance 409. Wires 410, 411, 412 and 413 are employed to obtain velocity information, i.e., voltage readings which are used to change the command signals to the motor.

Circuit 405 has four switches 420, 421, 422 and 423, mounted therein, one pair on each side of where line 406 crosses loop 405. Switch 420 is the forward (+) switch, i.e., it is the switch which provides current to the motor to turn in the direction designated as forward. Switch 423 is the forward (−) switch, i.e., the switch that when closed in conjunction with switch 422 completes the circuit through motor 407.

Figure 4:
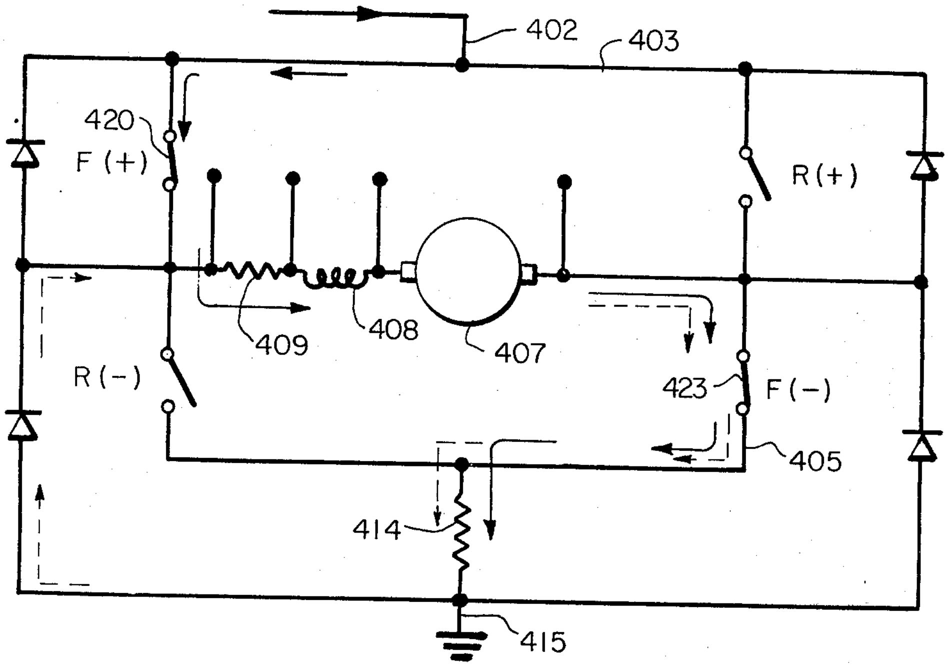
FIG. 4 is a circuit diagram showing the current flow driving the motor in a forward direction.

Looking now at FIG. 4, it is seen that when switches 420 and 423 are closed, the current flows through a portion of inner loop 405, across line 406, through motor 407, and through a second portion of loop 405.

Referring again to FIG. 1, it is seen that outer loop 404 has four diodes therein, one opposite each switch. Between each pair of switches and diodes are connector wires 416 and 417. The inner loop 405 is connected to the outer loop 404 also through a resistor 414 and is grounded through line 415.

Looking again at FIG. 4, it is seen that the current flows out of inner loop 405 through resistor 414 to ground wire 415.

When switches 420 and 423 are closed, the current builds up only limited by motor 407, speed, resistance and inductance.

Figure 5:
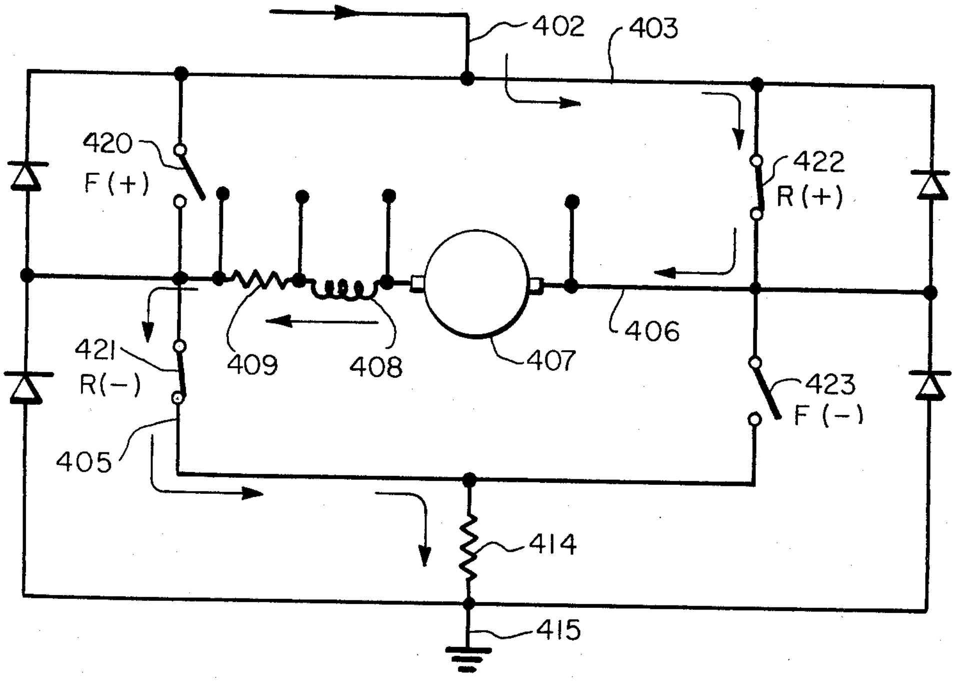
FIG. 5 is a circuit diagram showing the current flow for driving the motor in the reverse direction.

When the position desired is being approached and it is anticipated to reverse the current, switches 420 and 423 are opened and switches 421 and 422 are closed and the current is reversed as shown in FIG. 5. Switch 422 is the reverse (+) switch and switch 421 is the reverse (−) switch. In this condition, the current flows in the opposite manner to that shown in FIG. 4.

When you are running steady state in a forward direction, switch 420 is being opened and closed.

To avoid a large current build-up before reversing the direction of the motor, switch 420 is opened before switch 423 is opened. For purposes of illustrating this fact, refer to FIG. 10. There, the motor current Im is plotted against time $t$. At point 1, both switches 420 and 423 are closed and motor current is building up. At point 2, switch 420 is opened and the current begins to decay, until it reaches point 3, where switch 420 is again closed. During the period from point 2 to point 3, the current flows as shown by the dotted flow lines in FIG. 4. When the switch 420 is again closed, the current again flows as indicated by the solid lines in FIG. 4. The current flow during the period from point 2 to point 3 through switch 423 is decaying. The purpose of this is to provide a minimum delay before closing another switch so that the stored charge dissipates.

Figure 10:
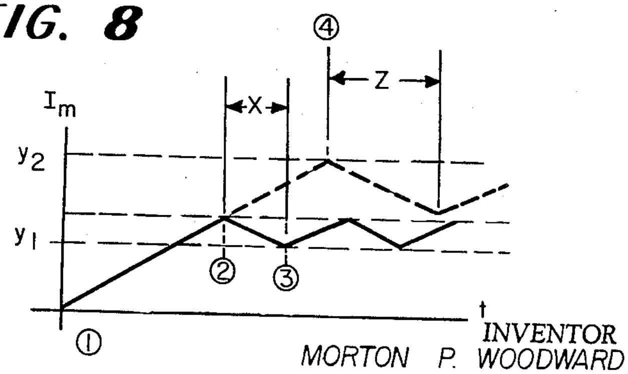
FIG. 10 is a graph showing typical plots of motor current versus time.

If the switch 420 being opened does not bring about a sufficient decay, i.e., if the current continues to climb as shown by the dotted lines in FIG. 10, at point 4, switch 423 is opened. This is to prevent a run-away current caused by current regeneration, i.e., current being added to the system by motor e.m.f.

In FIG. 10, the distance $x$ represents the time which the current decays. Thus, it is seen that the current is maintained between $Y_1$ and $Y_2$ as shown in FIG. 10.

Returning to the condition shown in FIG. 5, i.e., with the current reversed and the motor reversed. However, as in running forward, the current tends to build up and results in too much current, i.e., over that commanded by the computer or tape reader.

Figure 6:
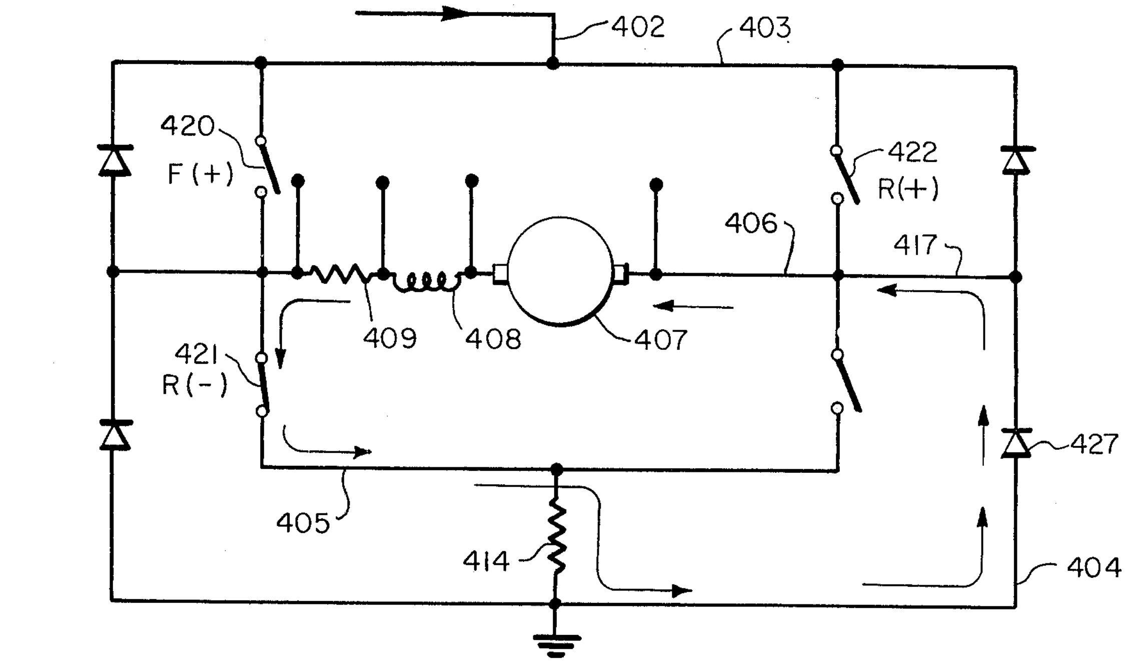
FIG. 6 is a circuit diagram showing the current flow during a period of current decay.

When the current reaches a sufficient level, the reverse (+) switch opens and the current begins to flow as shown in FIG. 6, through motor 407, through closed switch 421, resistor 414, around loop 404 and through diode 427.

Figure 7:
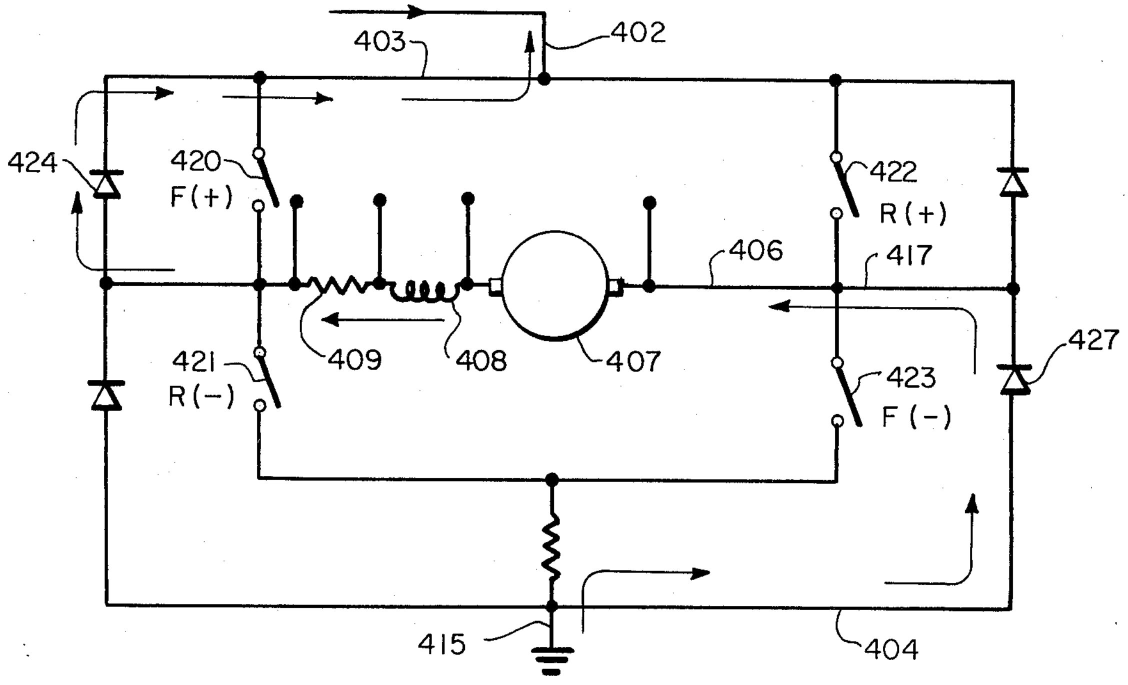
FIG. 7 is a circuit diagram of the present circuit showing the current flow as energy is fed back into the system.

If the velocity of motor 407 is high enough, the current will flow as indicated by the arrows in FIG. 6 but the current will continue to build up. The control looks at the current and determines if the measured current is higher than the allowed current. If the current is too high, the other reverse switch 421 is opened resulting in the current flow as shown in FIG. 7. At this point, energy is being pumped back into the system, i.e., the stored energy of the driven load goes back to the supply. As the power dissipates, the reverse (−) switch is again closed and, if necessary, reopened, until the current drops to the acceptable limit.

The plus and minus torque in opposite directions is the same, i.e., the system does not know which is plus and which is minus. The system is symmetrical.

Figure 8:
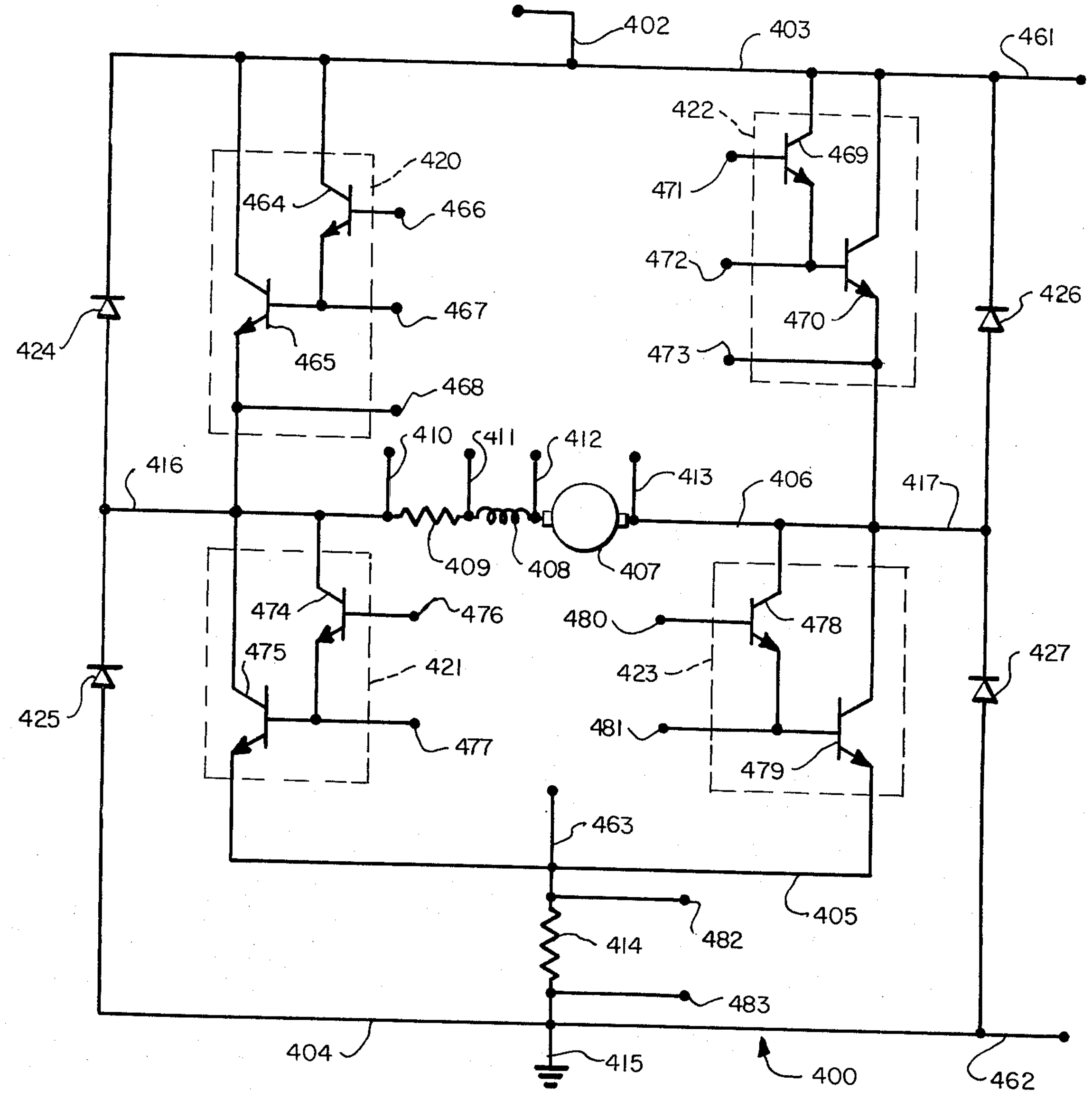
FIG. 8 is a more detailed circuit diagram of the bridge circuit of the present invention.
Figure 9:
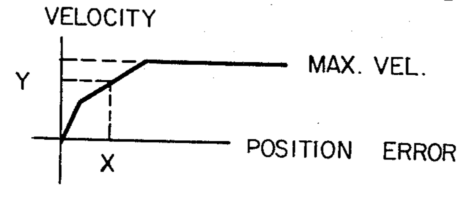
FIG. 9 is a graph showing a typical plot of velocity versus position error.

FIG. 8 shows the circuit comprising the present invention. Switch 420 is, in reality, a pair of transistors 464 and 465, arranged as shown. There are three leads, 446, 467 and 468, by which the switch is opened or closed by a logic signal. Switch 421 is composed of transistors 474 and 475 having power leads 476 and 477. Switch 422 is comprised of transistors 469 and 470 and leads 471, 472 and 473. Switch 423 is composed of leads 480 and 481 and transistors 478 and 479.

A pair of leads 482 and 483 are used in a voltage sensor to determine the voltage across resistor 414.

The bridge circuit described is a completely solid state system.

The four point pickup by leads 410 through 413 gives the voltage generated by the motor. It is better than a linear velocity readout of the machine since it is simply available at a convenient signal level.

The system described is completely digitalized and can be employed to run any servo system, especially those involving two or three axis positioning of heavy tables.

It will be apparent to those of ordinary skill in the art that many changes and departures may be made in the described system without deparing from the scope of the appended claims.

What we claim is:

1. In a solid state bridge circuit for a servo motor having a permanent magnet DC motor in the center of said bridge, four switching means as the arms of said bridge, and a ground and a power input connected to the other two ends of said bridge respectively, for controlling the direction and velocity of said motor, the improvement comprising:

a first resistor and an inductance in series with said motor in the center of said bridge;

a second resistor connected between said bridge and said ground;

first feedback means connected across said first resistor for motor current feedback;

second feedback means connected across said motor for motor velocity feedback;

third feedback means connected across said second resistor for motor current feedback; and each of said switching means includes a switch and a diode, the switch and diode are connected in parallel for the two arms of said bridge between said input and said motor and the diode is in parallel with said switch and said second resistor for the two arms of said bridge between said ground and said motor, said diodes being connected so as to provide a current path to allow said inductor to continue current flow when only one of said switching means is closed and to allow current to flow from ground through the bridge into said power input when all of said switching means are open.

2. A circuit as in claim 1 wherein each of said switches includes two transistors operating in the switching mode.

* * * * *